No. 892,046. PATENTED JUNE 30, 1908.
A. I. HALL.
PACKING MACHINE.
APPLICATION FILED APR. 18, 1907.
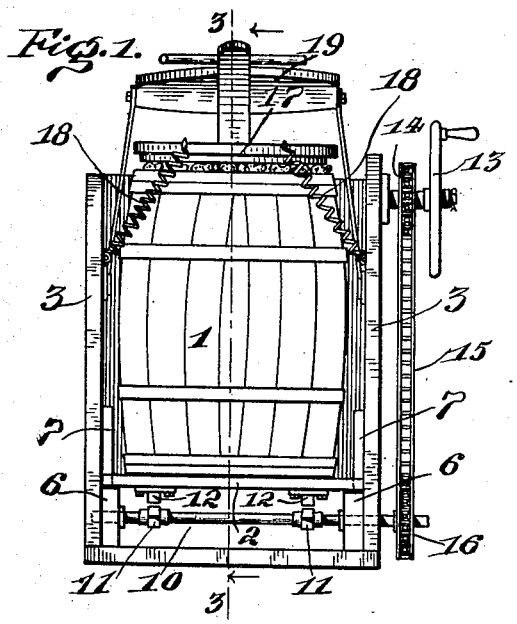
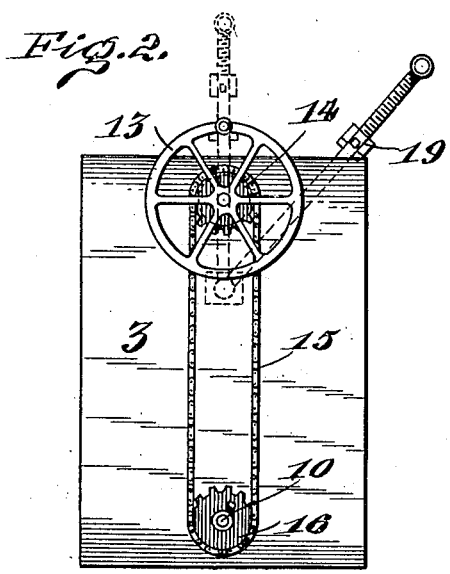
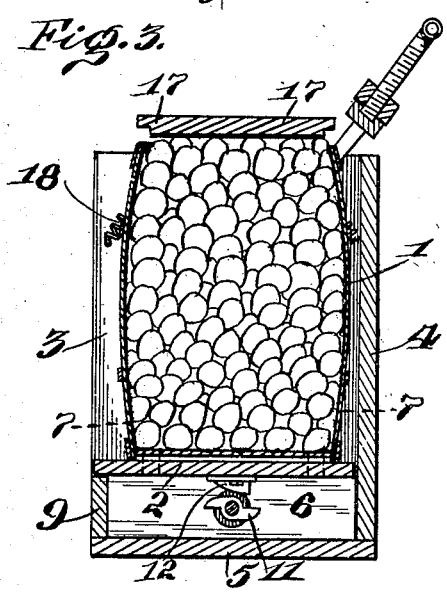
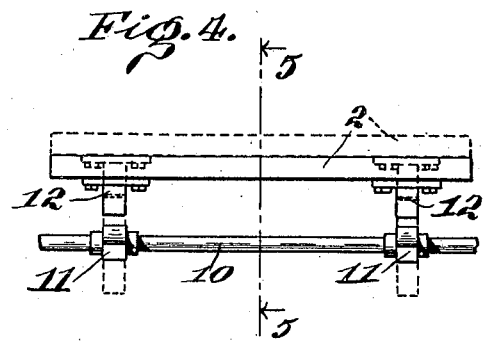
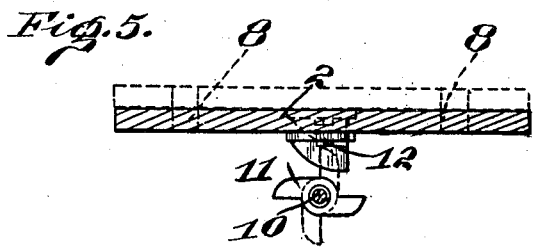
Attest:
N. O. Mitchell
C. S. Ashley
Inventor:
Albert I. Hall
by Wm B. Whitney
Atty

UNITED STATES PATENT OFFICE.

ALBERT I. HALL, OF ROCHESTER, NEW HAMPSHIRE.

PACKING-MACHINE.

No. 892,046. Specification of Letters Patent. Patented June 30, 1908.

Application filed April 18, 1907. Serial No. 368,880.

*To all whom it may concern:*

Be it known that I, ALBERT I. HALL, a citizen of the United States, residing at Rochester, county of Strafford, State of New Hampshire, have invented a certain new and useful Packing-Machine, of which the following is a specification.

This invention relates to a machine for packing apples and similar fruit, the object being to provide a machine by which the fruit may be shaken down and closely packed in the barrel or other receptacle in which it is placed for shipment to the market.

Apples are very generally packed for the market in barrels, and, unless fitted compactly together and held firmly in place, will in handling work about so as to pack more closely together and thus become loose or "slack." Good results can of course be obtained by carefully packing the fruit by hand, but such work is expensive and careful packers are hard to find.

The method heretofore commonly employed has been to put a half bushel or so of fruit in a barrel and rock the barrel back and forth on its bottom, then add another half bushel of fruit and repeat the rocking movement, and so on until the barrel is filled, whereupon a head is fitted on top of the fruit and pressed down into place and there secured. In this rocking movement, however, as the barrel is raised and dropped first on one edge and then on another, without confining the fruit, the tendency is to shake down the fruit on one side of the barrel and at the same time to cause that already shaken down on the other side to rebound and become loose again. Thus, it has been found practically impossible to pack fruit satisfactorily in this way, or so that it will not reach the market in a more or less "slack" condition without pressing it down so hard as thereby to injure it to a great extent; and the amount of the losses due to poor packing will be appreciated when it is understood that every "slack" barrel of apples commands in the market a price from twenty-five cents to one dollar less than that paid for a "tight" barrel.

Fruit can be well and cheaply packed, and the alternative of a loss in its market value or an excessive cost for labor largely obviated, by the use of the packing machine hereinafter described and claimed, and illustrated in the accompanying drawing in which—

Figure 1 is a front elevation, with a part of the front removed to show the mechanism at the bottom; Fig. 2, a side elevation; Fig. 3, a vertical section on the line 3 3 of Fig. 1; Fig. 4, a detail, somewhat enlarged, of the mechanism at the lower part of the machine; and Fig. 5, a section on the line 5 5 of Fig. 4.

Like reference characters indicate corresponding parts in the several figures.

Referring to the drawing, 1 is a barrel of fruit standing on a movable bottom or platform 2, at the lower end of an upright box, open at the front and top, comprising side walls 3, back 4, and bottom 5. The movable platform rests normally upon blocks or supports 6, suitably secured in place, and is capable of movement up and down on guides 7 working in grooves 8 in the ends of the platform. The compartment formed by the platform at the bottom of the box is closed by a front piece 9 secured, say, to the bottom and side walls. A shaft 10, journaled in the sides of the box, has mounted thereon cam or wiper wheels 11, the arms of which act against the inclined faces of blocks 12, secured to the lower side of the platform, to rest and drop the platform and the barrel of fruit thereon, the shaft being driven by means of a crank or hand-wheel 13 and sprocket 14, suitably mounted at the upper part of the box, chain 15, and sprocket 16, mounted on an extension of the shaft at that side of the box. A cover 17 fits over the top of the barrel and during the operation of the machine is held down on top of the fruit therein by springs 18 detachably secured thereto. An ordinary screw pressing-head 19 for pressing the head of the barrel into place is pivotally attached to the sides of the box so that it can be tipped back out of the way until needed.

Briefly stated, the operation of the machine is as follows: The barrel is filled up with fruit and placed on the platform, the cover is put in place and the springs attached, and then a few turns of the hand-wheel raises and drops the barrel perpendicularly so as to shake down and pack the fruit uniformly, while the spring-pressed cover confines the fruit in place and otherwise aids in the packing. The springs are then detached, the cover is removed and a barrel-head substituted therefor, and the screw pressing-head is raised into position and used to press the head into place where it is secured in the usual manner.

While I have described my invention as used for packing apples in barrels and in what I now regard as its best form, it is obvious that it is well adapted for packing other similar fruits and in boxes or other receptacles as well as in barrels, and that the several parts of the machine can be variously modified, or equivalents substituted therefor, without departing from the spirit or sacrificing the advantages thereof. For example, the machine can be used, although not so advantageously, without any spring-pressed cover; the platform may be stationary and larger cams made to operate through openings therein directly against the bottom of the barrel; and other equivalent means can be used in place of the cam wheels shown and described for raising and dropping the barrel. Such other modifications can also be made as fall within the scope of the appended claims.

What I claim as new, and desire to secure by Letters Patent, is—

1. In a machine of the character described, means for raising and dropping a barrel or other receptacle for fruit and means for confining and pressing down the fruit in said receptacle during the raising and dropping thereof.

2. In a machine of the character described, a platform resting upon supports, means for raising said platform upwards from and dropping it back upon said supports and a cover adapted to be placed temporarily over a barrel or other receptacle for fruit standing on said platform to confine and press down the fruit therein during the operation of the machine.

3. In a mechanism of the character described, a box open at the top and front and having a movable platform resting upon supports at the bottom, means for raising said platform upwards from and dropping it back upon said supports, and a screw pressing-head at the upper end of said box and pivotally mounted thereon.

ALBERT I. HALL.

Witnesses:
ELMER J. SMART,
STEPHEN D. WENTWORTH.